US008902342B2

(12) United States Patent
Araoka et al.

(10) Patent No.: US 8,902,342 B2
(45) Date of Patent: Dec. 2, 2014

(54) SOLID-STATE IMAGE SENSOR WITH FEEDBACK CIRCUITS

(71) Applicant: Canon Kabushiki Kaisha, Tokyo (JP)

(72) Inventors: Yukio Araoka, Hiratsuka (JP); Satoru Shingai, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/217,919

(22) Filed: Mar. 18, 2014

(65) Prior Publication Data

US 2014/0197302 A1 Jul. 17, 2014

Related U.S. Application Data

(62) Division of application No. 13/477,456, filed on May 22, 2012, now abandoned.

(30) Foreign Application Priority Data

Jun. 3, 2011 (JP) ................................. 2011-125711

(51) Int. Cl.
| | |
|---|---|
| *H04N 5/335* | (2011.01) |
| *H04N 3/14* | (2006.01) |
| *H04N 5/369* | (2011.01) |
| *H04N 5/378* | (2011.01) |
| *H04N 5/232* | (2006.01) |

(52) U.S. Cl.
CPC ............... *H04N 5/369* (2013.01); *H04N 5/378* (2013.01); *H04N 5/23245* (2013.01)
USPC ...................................... 348/302; 250/208.1

(58) Field of Classification Search
CPC ..... H04N 5/378; H04N 5/374; H04N 5/3575; G01J 1/46
USPC ............... 348/207.99, 294, 300–302, 308; 250/214.1, 214 A, 214 AG, 208.1; 257/291, 292
See application file for complete search history.

(56) References Cited

U.S. PATENT DOCUMENTS

| | | | | |
|---|---|---|---|---|
| 6,459,078 | B1 * | 10/2002 | Fowler ....................... | 250/214 A |
| 6,801,258 | B1 * | 10/2004 | Pain et al. ..................... | 348/302 |
| 2002/0134918 | A1 * | 9/2002 | Miida ......................... | 250/214.1 |
| 2005/0274873 | A1 * | 12/2005 | Liu et al. ..................... | 250/208.1 |
| 2007/0007438 | A1 * | 1/2007 | Liu et al. ................. | 250/214 AG |
| 2008/0074521 | A1 * | 3/2008 | Olsen ............................ | 348/300 |
| 2010/0259661 | A1 * | 10/2010 | Tejada et al. ................. | 348/308 |

FOREIGN PATENT DOCUMENTS

JP 2005-269471 A 9/2005

* cited by examiner

*Primary Examiner* — Dennis Hogue
(74) *Attorney, Agent, or Firm* — Fitzpatrick, Cella, Harper & Scinto (57) ABSTRACT

A solid-state image sensor comprising a pixel array having a plurality of pixels, and a plurality of signal processing circuits each of which amplifies a signal of the pixel array, wherein each of the plurality of signal processing circuits comprises an operation amplifier having an input terminal and an output terminal, an input capacitance arranged between the input terminal and the column signal line, and a feedback circuit which connects the input terminal with the output terminal, wherein the feedback circuit is configured to form a feedback path in which a first and a second capacitance elements are arranged in series in a path connecting the input terminal to the output terminal, and a third capacitance element is arranged between a reference potential and a path connecting the first capacitance element to the second capacitance element.

6 Claims, 6 Drawing Sheets

FIG. 6

SOLID-STATE IMAGE SENSOR WITH FEEDBACK CIRCUITS

This application is a divisional of application Ser. No. 13/477,456, filed on May 22, 2012, which is pending.

BACKGROUND OF THE INVENTION

1. Field of the Invention

The present invention relates to a solid-state image sensor.

2. Description of the Related Art

The basic arrangement of a solid-state image sensor 1 will be described with reference to FIG. 1. The solid-state image sensor 1 comprises a pixel array 10 including a plurality of pixel units 11, and a signal processing circuit 20 for amplifying a signal output from the pixel array 10 to a column signal line 2. In each pixel unit 11, a transfer transistor TX transfers, for example, charges generated by the energy of light received by a photodiode PD to the gate of a source follower transistor SF. Then, the source follower transistor SF outputs a signal corresponding to the transferred charges to the column signal line 2 via a selection transistor SEL. Each pixel unit 11 can include a reset transistor RES for resetting the potential of the gate of the source follower transistor SF to a predetermined voltage.

The signal processing circuit 20 is used to amplify the signal output from each pixel unit 11 to the column signal line 2. The signal processing circuit 20 includes an operation amplifier 21 having an input terminal 22 and an output terminal 23, an input capacitance C0 inserted between the input terminal 22 and the column signal line 2, and a feedback capacitor Cf connecting the input terminal 22 to the output terminal 23. The amplification factor of the signal processing circuit 20 is determined based on a capacitance ratio C0/Cf. To change the amplification factor, for example, to switch the sensitivity setting of a digital still camera, it is only necessary to change the ratio C0/Cf. To change the amplification factor from, for example, 32 to 128, it is only necessary to increase the value of C0 by a factor of four or decrease the value of Cf to a quarter.

To improve the sensitivity of light detection, a high amplification factor is required for the signal processing circuit 20. This especially applies to a case in which a signal output to the column signal line 2 becomes very weak due to the reduction in the size of a photoelectric conversion element such as the photodiode PD or a case in which the sensitivity of a camera having the solid-state image sensor 1 is set to be higher. To increase the amplification factor of the signal processing circuit 20, it is generally necessary (1) to increase the value of C0, (2) to decrease the value of Cf, or (3) to increase the value of C0 and decrease the value of Cf. However, increasing the capacitance value may cause an increase in chip area, and decreasing the capacitance value may cause a production variation.

SUMMARY OF THE INVENTION

The present invention provides a technique which is advantageous in increasing an amplification factor while suppressing an increase in chip area and a production variation.

One of the aspects of the present invention provides a solid-state image sensor comprising a pixel array having a plurality of pixels, and a plurality of signal processing circuits each of the plurality of signal processing circuits amplifying a signal output from the pixel array to a plurality of column signal lines, wherein each of the plurality of signal processing circuits comprises an operation amplifier which has an input terminal and an output terminal, an input capacitance arranged between the input terminal and the column signal line, and a feedback circuit which connects the input terminal with the output terminal, wherein the feedback circuit is configured to form a feedback path in which a first capacitance element and a second capacitance element are arranged in series in a path connecting the input terminal to the output terminal, and a third capacitance element is arranged between a reference potential and a path connecting the first capacitance element to the second capacitance element.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

First Embodiment

Figure 2:
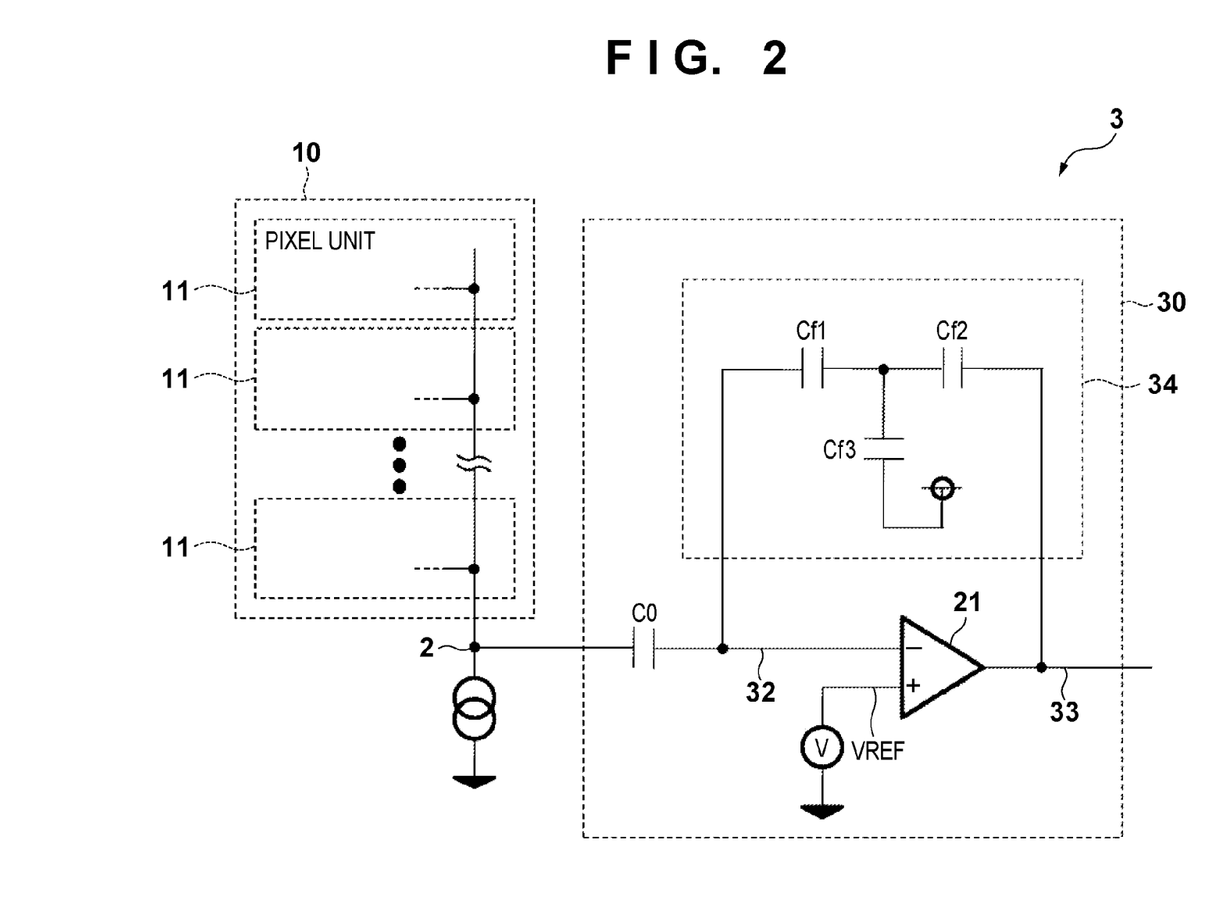
FIG. 2 is a circuit diagram showing an example of a solid-state image sensor for explaining the present invention.

A signal processing circuit according to the first embodiment includes an operation amplifier having an input terminal and an output terminal, an input capacitance arranged between the input terminal and a column signal line, and a feedback circuit for connecting the input terminal with the output terminal. The feedback circuit has an arrangement in which a first capacitance element Cf1 and a second capacitance element Cf2 are arranged in series in a path connecting the input terminal to the output terminal, and a third capacitance element Cf3 is inserted between a reference potential and a path connecting the capacitance elements Cf1 and Cf2. Note that the reference potential may be, for example, a ground potential in the feedback circuit.

The feedback circuit may be, for example, a feedback circuit 34 shown in FIG. 2. In the feedback circuit 34, the first capacitance element Cf1 and the second capacitance element Cf2 are connected in series in a path connecting an input terminal 32 and output terminal 33 of an operation amplifier 21. In the feedback circuit 34, the third capacitance element Cf3 is also connected between the reference potential and a node connecting the capacitance elements Cf1 and Cf2.

The combined capacitance value of the feedback capacitors of the feedback circuit 34 is given by:

$$Cf = (Cf1 \times Cf2)/(Cf1 + Cf2 + Cf3) \quad (1)$$

The amplification factor of the signal processing circuit 30 in this embodiment is given by:

$$C0/Cf = C0 \times (Cf1 + Cf2 + Cf3)/(Cf1 \times Cf2) \quad (2)$$

Increase amounts of the areas of the signal processing circuit 20 of FIG. 1 and a signal processing circuit 30 of this embodiment upon changing the amplification factor, for example, from 32 to 128 will be quantitatively compared with each other below. A case in which a minimum capacitance element usable without being substantially influenced by a production variation is considered to have a capacitance value of 0.1 pF will be described.

Figure 1:
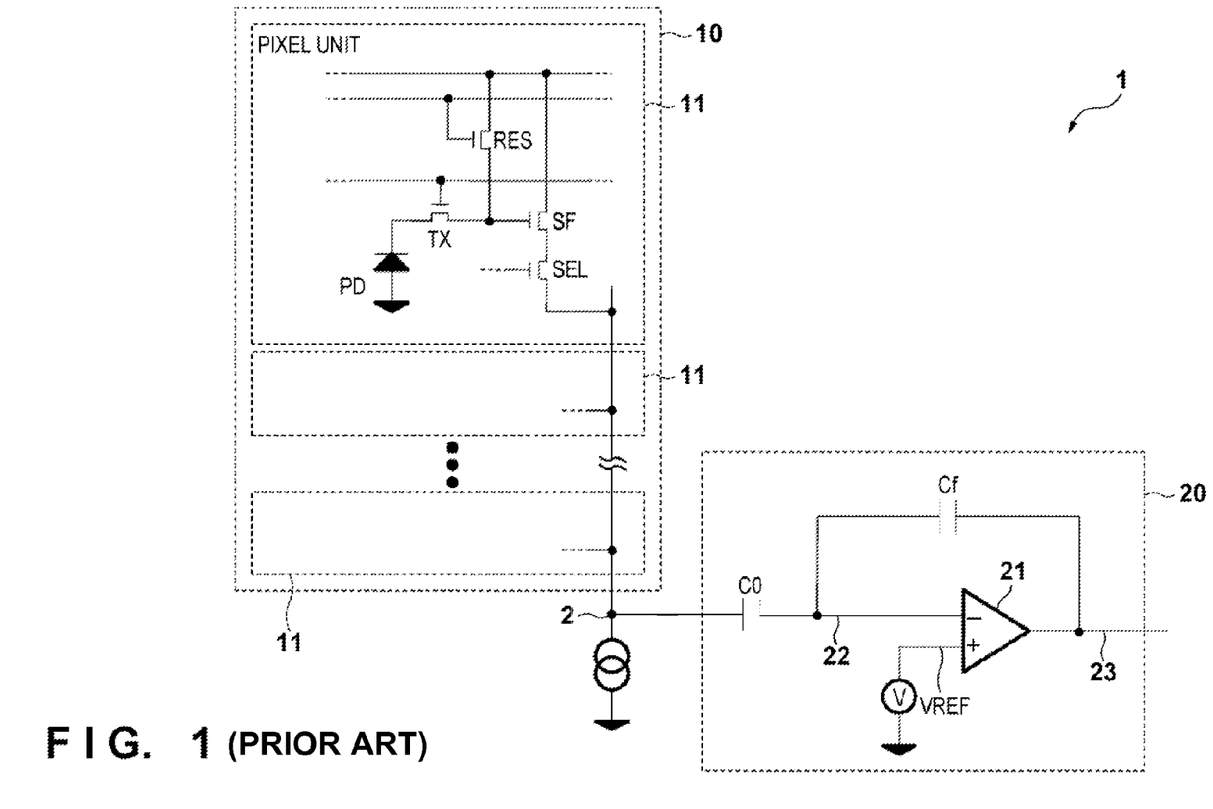
FIG. 1 is a circuit diagram for explaining a solid-state image sensor according to the prior art.

For the signal processing circuit 20 of FIG. 1, for example, if C0=3.2 pF and Cf=0.1 pF, it is not preferable to decrease the value of Cf to a value smaller than 0.1 pF. It is, therefore, possible to obtain a target amplification factor by setting C0=12.8 pF and Cf=0.1 pF. On the other hand, for the signal processing circuit 30 of this embodiment, it is possible to obtain a target amplification factor by setting C0=3.2 pF intact, and setting Cf1=0.1 pF, Cf2=0.1 pF, and Cf3=0.2 pF instead of Cf for the signal processing circuit 20.

That is, upon changing the amplification factor from 32 to 128 without using a capacitance element having a capacitance value of 0.1 pF or smaller, which is the value of the minimum capacitance element, the chip area may widen by an amount corresponding to a difference of 9.6 pF which is obtained by changing the value of C0 from 3.2 pF to 12.8 pF for the arrangement shown in FIG. 1. On the other hand, in this embodiment, for the signal processing circuit 30 which has C0=3.2 pF, and has Cf1=0.1 pF, Cf2=0.1 pF, and Cf3=0.2 pF instead of Cf=0.1 pF, a total increase in chip area is as small as 0.3 pF. In this embodiment, if C0=1.6 pF, it is possible to use a feedback circuit 34 which has Cf1=0.1 pF, Cf2=0.1 pF, and Cf3=0.6 pF. This enables to change the amplification factor from 32 to 128 while suppressing an increase in chip area by an amount corresponding to 1.2 pF.

Figure 3:
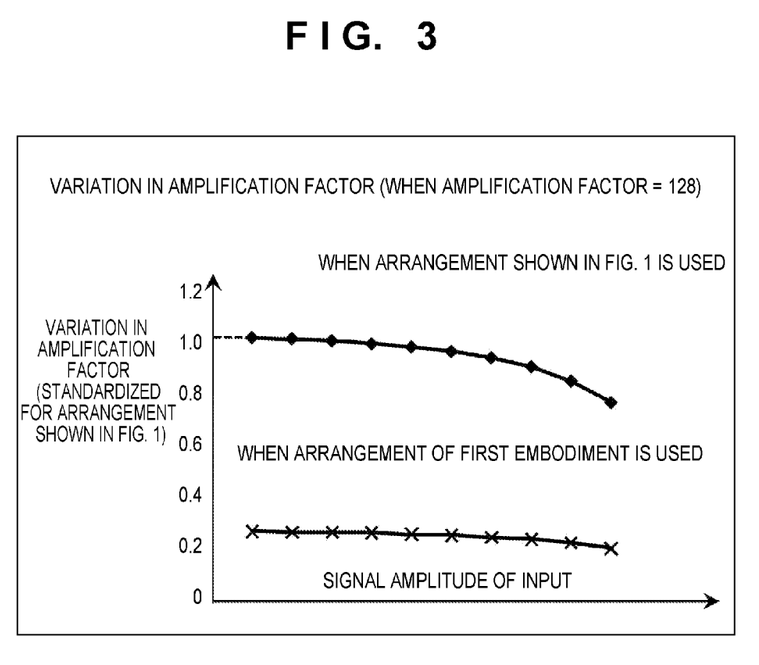
FIG. 3 is a graph showing an amplification variation for explaining the effects of the present invention.

For the arrangement shown in FIG. 1, to change the amplification factor from 32 to 128, it is possible to use a method of connecting, in series, four capacitance elements each having a capacitance value of 0.1 pF as a method of decreasing Cf to a quarter. In this case, four minimum capacitance elements are used. Therefore, the present invention has the advantage over the arrangement shown in FIG. 1 from the viewpoint of suppressing not only an increase in chip area but also a production variation. FIG. 3 is a graph plotting a production variation (a standardized value for the arrangement shown in FIG. 1) for the signal amplitude of an input when the amplification factor is 128, and showing a comparison between a case in which the arrangement shown in FIG. 1 is used and a case in which the arrangement of this embodiment is used. Assume that both the arrangements have respectively been manufactured on semiconductor substrates by the same manufacturing process. In this case, in the arrangement of this embodiment, a variation in the amplification factor is decreased to one fifth, as shown in FIG. 3. Furthermore, as shown in FIG. 3, as the amplitude of the input on the abscissa becomes larger, the linearity of the characteristics of the amplifier is lost and the amplification factor deteriorates in the arrangement shown in FIG. 1 but it does not deteriorate in the arrangement of this embodiment.

As described above, according to this embodiment, it is possible to obtain a high amplification factor while suppressing an area cost and a production variation.

Second Embodiment

Figure 4:
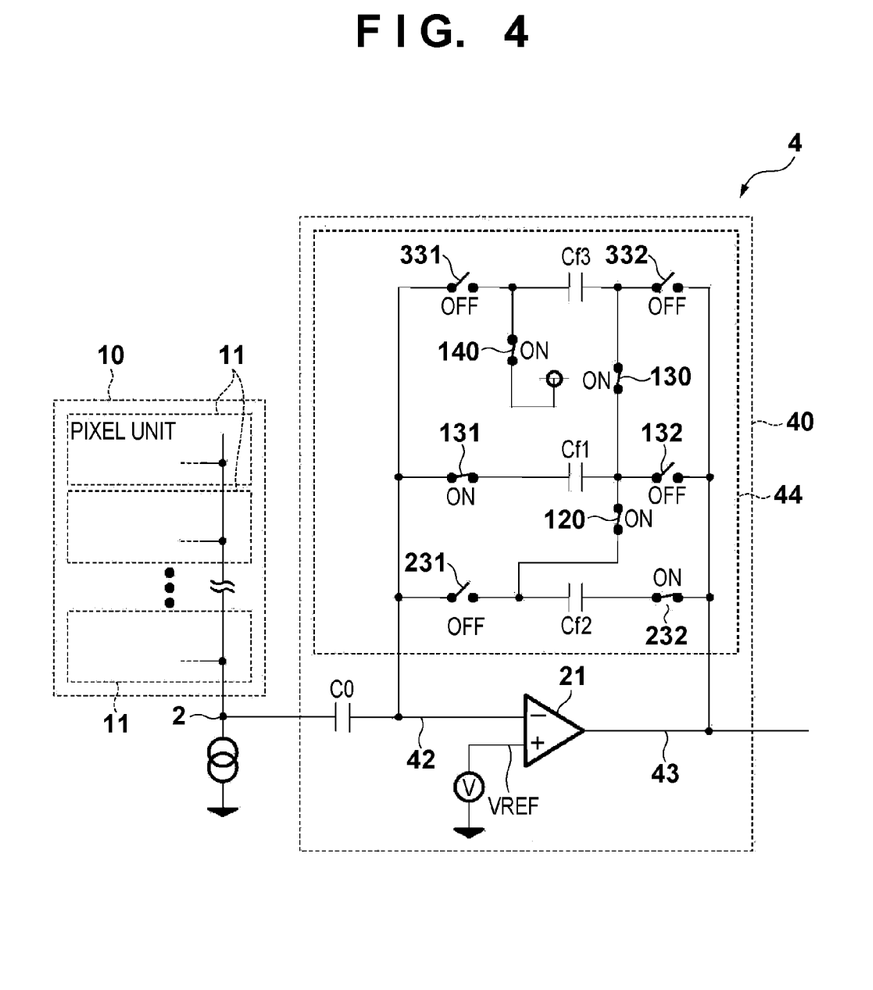
FIG. 4 is a circuit diagram showing an example of a solid-state image sensor for explaining the present invention.

FIG. 4 is a circuit diagram showing a solid-state image sensor 4 according to the second embodiment. The solid-state image sensor 4 has a first mode and a second mode as operation modes. The solid-state image sensor 4 is configured to have a pixel array 10 and a plurality of signal processing circuits 40. For example, a feedback circuit 44 included in the signal processing circuit 40 has, in a path connecting an input terminal 42 and output terminal 43 of an operation amplifier 21, the following paths in parallel:

(1) a first path in which a switch 131, a capacitance element Cf1, and a switch 132 are connected in series;

(2) a second path in which a switch 231, a capacitance element Cf2, and a switch 232 are connected in series; and (3) a third path in which a switch 331, a capacitance element Cf3, and a switch 332 are connected in series.

Furthermore, the feedback circuit 44 can include a switch 120 between a path connecting the capacitance element Cf1 to the switch 132 and a path connecting the capacitance element Cf2 to the switch 231. The feedback circuit 44 can also include a switch 130 between a path connecting the capacitance element Cf1 to the switch 132 and a path connecting the capacitance element Cf3 to the switch 332, and a switch 140 between a reference potential and a path connecting the capacitance element Cf3 to the switch 331.

A status in which each switch is ON or OFF as shown in FIG. 4 represents the first mode. The second mode indicates a status in which each switch shown in FIG. 4 is set to the opposite state. In both these modes, the states of the plurality of switches are controlled so that a feedback path in which the capacitance elements Cf1 and Cf2 are connected in series and the capacitance element Cf3 is connected between the reference potential and a node between the capacitance elements Cf1 and Cf2 is formed in the first mode, and the feedback path is not formed in the second mode. The solid-state image sensor 4 can be configured to include three or more operation modes and to control the states of the plurality of switches, thereby enabling to form the feedback path in the first mode and not to form the feedback path in other modes.

Third Embodiment

Figure 5:
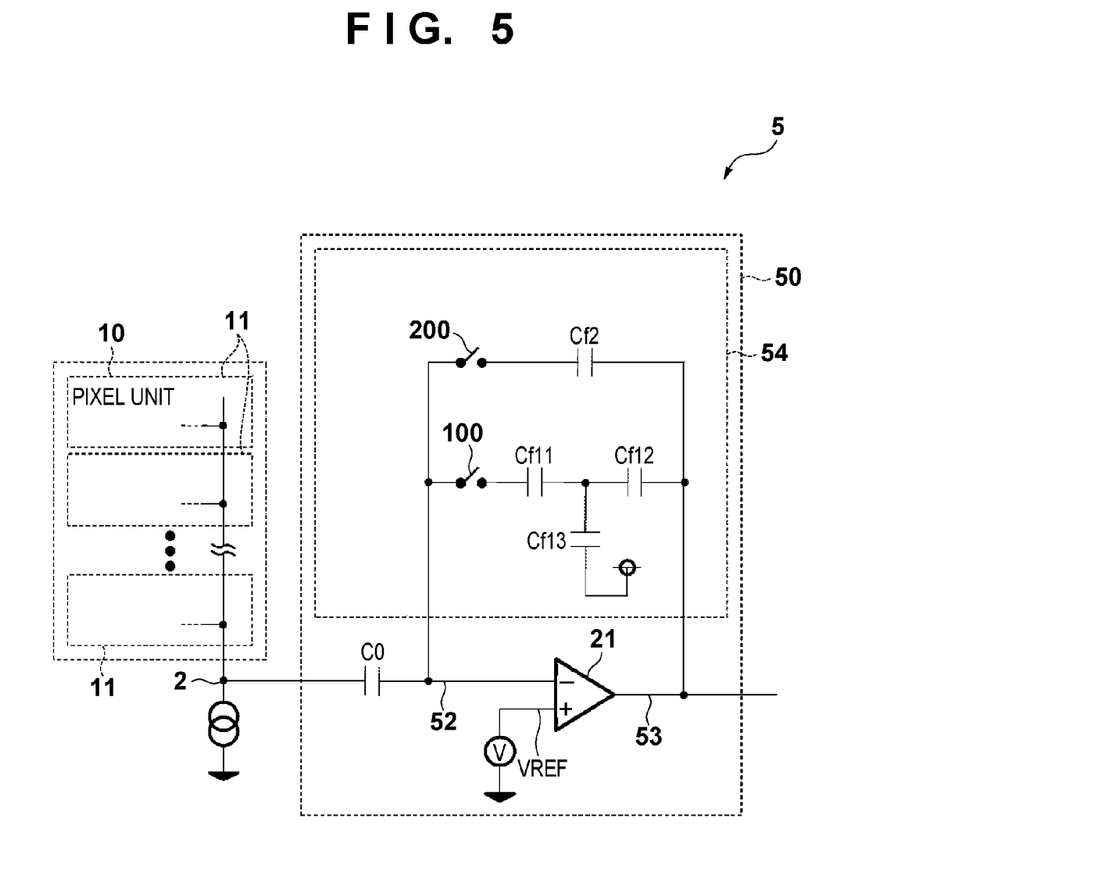
FIG. 5 is a circuit diagram showing an example of a solid-state image sensor for explaining the present invention.

FIG. 5 is a circuit diagram showing a solid-state image sensor 5 according to the third embodiment. The solid-state image sensor 5 includes a first mode and a second mode as operation modes. The solid-state image sensor 5 is configured to have a pixel array 10 and a plurality of signal processing circuits 50. A feedback circuit 54 included in the signal processing circuit 50 has, in a path connecting an input terminal 52 and output terminal 53 of an operation amplifier 21, a first feedback path and a second feedback path in parallel.

In the first feedback path, a switch 100, a capacitance element Cf11, and a capacitance element Cf12 are connected in series, and a capacitance element Cf13 is inserted between a reference potential and a path connecting the capacitance elements Cf11 and Cf12. In the second feedback path, a switch 200 and a capacitance element Cf2 are connected in series. In the feedback circuit 54, for example, it is possible to form the first feedback path by turning on the switch 100 and turning off the switch 200 in response to a first control signal (not shown). Furthermore, in the feedback circuit 54, for example, it is possible to form the second feedback path by turning off the switch 100 and turning on the switch 200 in response to a second control signal (not shown). Consequently, it is possible to make the amplification factor of the signal processing circuit 50 in forming the first feedback path different from that in forming the second feedback path. Furthermore, the solid-state image sensor 5 can be configured to include three or more operation modes and to control the states of the switches, thereby making amplification factors in feedback paths formed in the respective operation modes different from each other.

Fourth Embodiment

Figure 6:
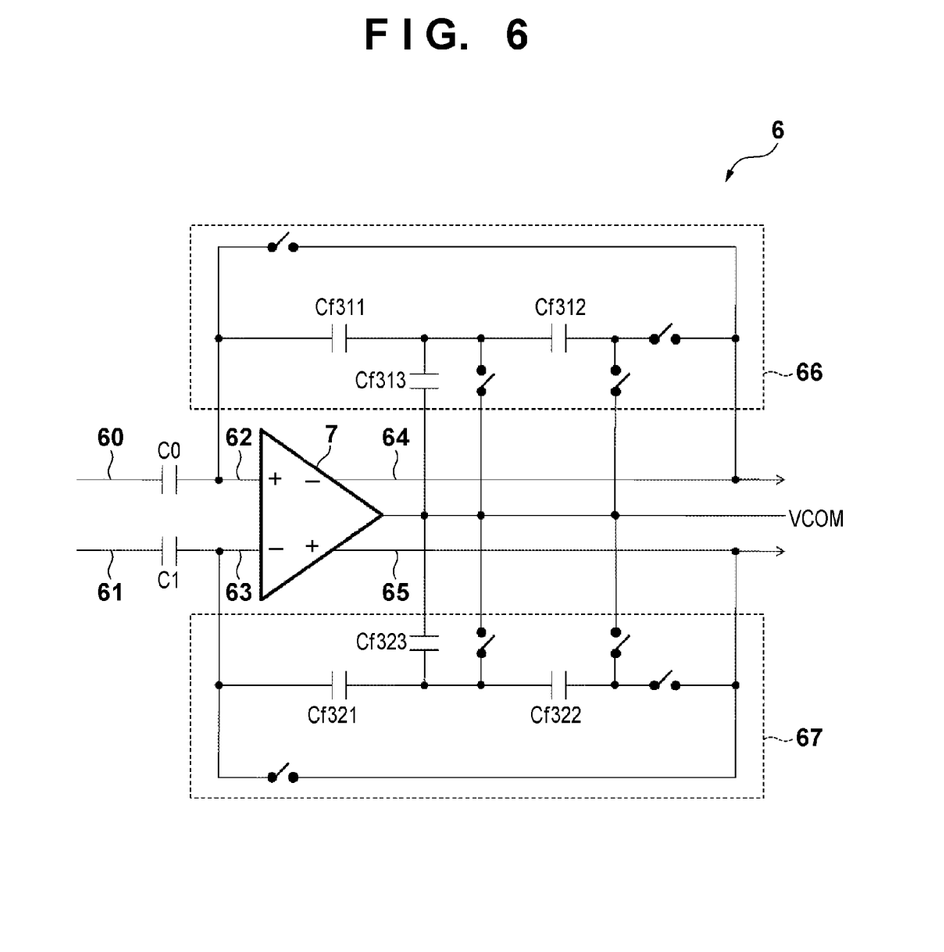
FIG. 6 is a circuit diagram showing an example of a signal processing circuit to which the present invention is applied.

FIG. 6 is a circuit diagram showing a signal processing circuit 6 according to the fourth embodiment. The signal processing circuit 6 includes a fully-differential amplifier 7, input capacitances C0 and C1, and feedback circuits 66 and 67. The fully-differential amplifier 7 has a common-mode voltage node VCOM, input terminals 62 and 63, and output terminals 64 and 65. The input capacitance C0 is arranged between the input terminal 62 and a column signal line 60, and the input capacitance C1 is arranged between the input terminal 63 and a column signal line 61. The feedback circuit 66 connects the input terminal 62 with the output terminal 64, and the feedback circuit 67 connects the input terminal 63 with the output terminal 65. Note that a pixel array is the same as that in the first to third embodiments of the present invention, and is therefore not shown.

The feedback circuit 66 has a first capacitance element Cf311, a second capacitance element Cf312, and a third capacitance element Cf313. In the feedback circuit 66, the first capacitance element Cf311 and the second capacitance element Cf312 are arranged in series in a path connecting the input terminal 62 to the output terminal 64. Furthermore, in the feedback circuit 66, the third capacitance element Cf313 is arranged between a reference potential and a path connecting the capacitance elements Cf311 and Cf312. The feedback circuit 67 has a first capacitance element Cf321, a second capacitance element Cf322, and a third capacitance element Cf323. In the feedback circuit 67, the first capacitance element Cf321 and the second capacitance element Cf322 are arranged in series in a path connecting the input terminal 63 to the output terminal 65. Furthermore, in the feedback circuit 67, the third capacitance element Cf323 is arranged between the reference potential and a path connecting the capacitance elements Cf321 and Cf322. The capacitance elements Cf313 and Cf323 can be connected with the common-mode voltage node VCOM as the reference potential.

As described above, the present invention is applicable to other amplification circuits, as a matter of course.

As an application example of the solid-state image sensor according to each of the above-described embodiments, a camera incorporating the solid-state image sensor will be exemplified below. The camera conceptually includes not only a device whose principal purpose is photographing but also a device (for example, a personal computer or portable terminal) additionally provided with a photographing function. The camera includes the solid-state image sensor according to the present invention, which has been exemplified in the above embodiments, and a processing unit for processing a signal output from the solid-state image sensor. The processing unit can include, for example, an A/D converter, and a processor for processing digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-125711, filed Jun. 3, 2011, which is hereby incorporated by reference herein in its entirety.

What is claimed is:

1. A solid-state image sensor comprising a pixel array having a plurality of pixels, and a plurality of signal processing circuits, each of the plurality of signal processing circuits amplifying a signal output from the pixel array to a plurality of column signal lines, wherein each of the plurality of signal processing circuits comprises a fully-differential operation amplifier, including a non-inverting input terminal, an inverting input terminal, an inverting output terminal, and a non-inverting output terminal, a first input capacitance arranged between the non-inverting input terminal and a first column signal line of the plurality of column signal lines, a first feedback circuit which connects the non-inverting input terminal with the inverting output terminal, a second input capacitance arranged between the inverting input terminal and a second column signal line of the plurality of column signal lines, and a second feedback circuit which connects the inverting input terminal with the non-inverting output terminal, wherein the first feedback circuit is configured to form a first feedback path in which a first capacitance element and a second capacitance element are arranged in series in a path connecting the non-inverting input terminal with the inverting output terminal, and a third capacitance element is arranged between a reference potential and a path connecting the first capacitance element to the second capacitance element, and the second feedback circuit is configured to form a second feedback path in which a fourth capacitance element and a fifth capacitance element are arranged in series in a path connecting the inverting input terminal with the non-inverting output terminal, and a sixth capacitance element is arranged between the reference potential and a path connecting the fourth capacitance element to the fifth capacitance element.

2. The solid-state image sensor according to claim 1, wherein
the solid-state image sensor includes a first mode and a second mode as operation modes, and
the first feedback circuit and the second feedback circuit include a plurality of switches, controlled to form the first feedback path and the second feedback path in the first mode, and not to form the first feedback path and the second feedback path in the second mode.

3. The solid-state image sensor according to claim 1, wherein the reference potential is a common-mode potential of the fully-differential operation amplifier.

4. The solid-state image sensor according to claim 3, wherein each of the plurality of signal processing circuits further comprises:
a first switch arranged between the common-mode potential and a path connecting the first capacitance element to the second capacitance element, in parallel with the third capacitance element, and
a second switch arranged between the common-mode potential and a path connecting the fourth capacitance element to the fifth capacitance element, in parallel with the sixth capacitance element.

5. The solid-state image sensor according to claim 1, wherein
the first capacitance element and the second capacitance element are connected in series to connect the non-inverting input terminal with the inverting output terminal, and the third capacitance element is connected between the reference potential and a node connecting the first capacitance element to the second capacitance element, and
the fourth capacitance element and the fifth capacitance element are connected in series to connect the inverting input terminal with the non-inverting output terminal, and the sixth capacitance element is connected between the reference potential and a node connecting the fourth capacitance element to the fifth capacitance element.

6. A camera comprising:
a solid-state image sensor according to claim 1; and
a processing unit which processes a signal output from the solid-state image sensor.

* * * * *